UNITED STATES PATENT OFFICE.

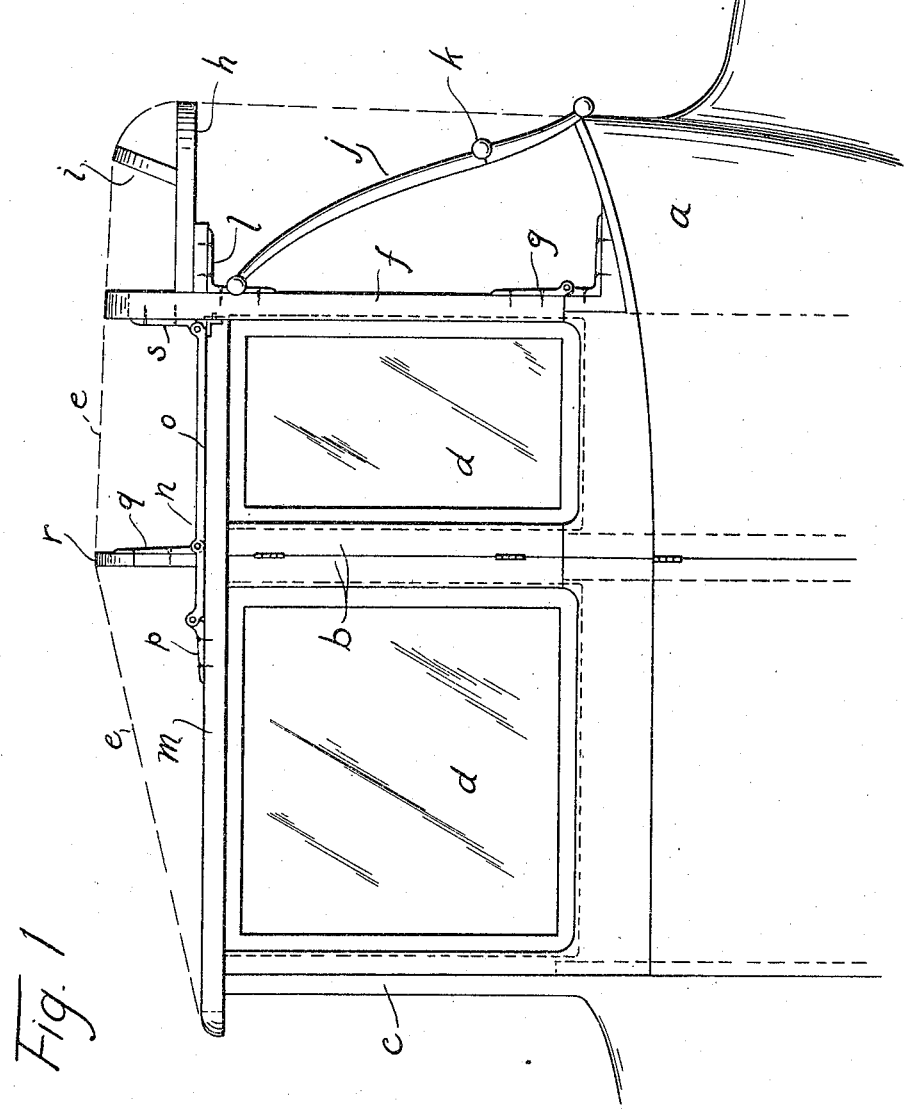

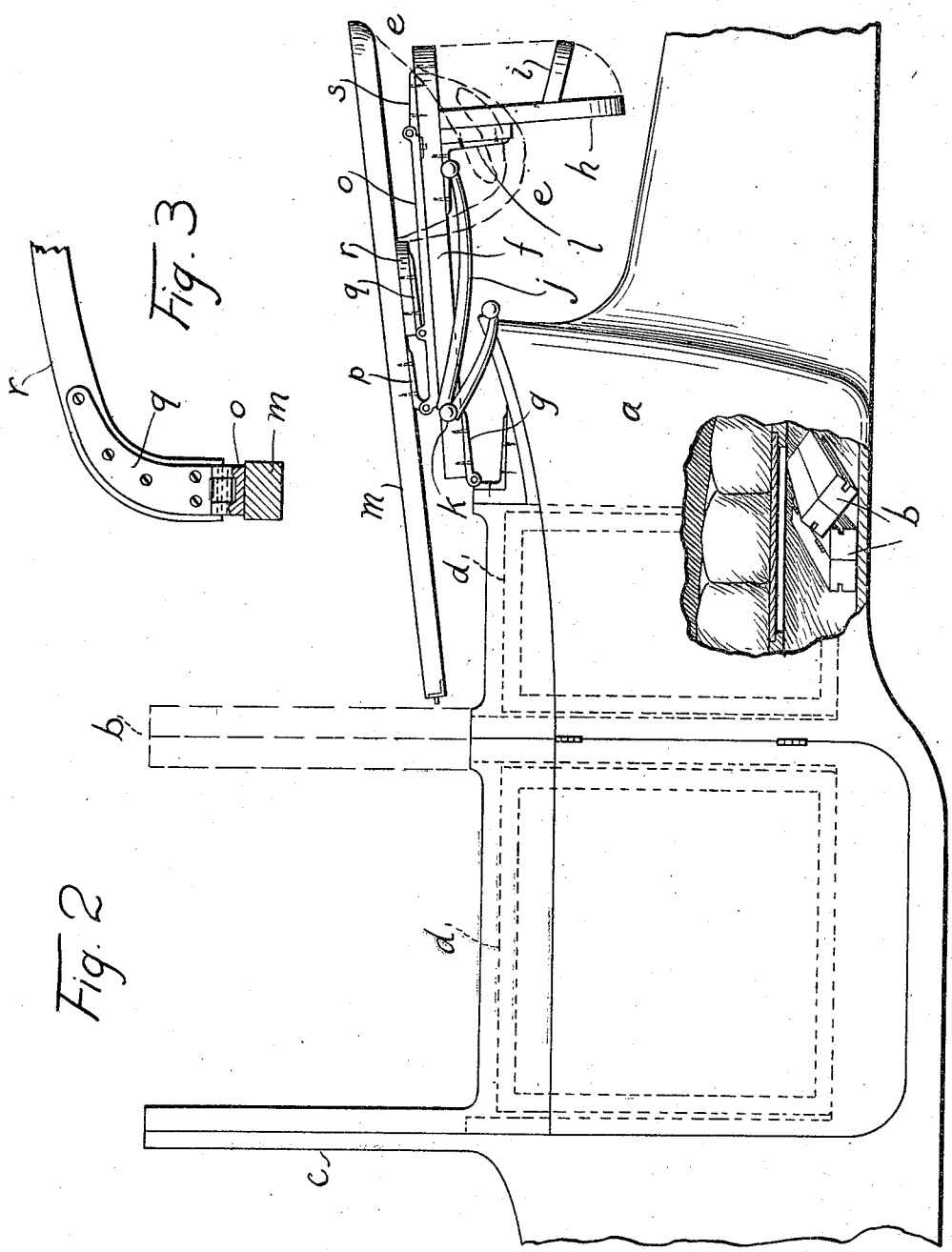

GEORGE S. SMITH, OF DETROIT, MICHIGAN, ASSIGNOR, BY MESNE ASSIGNMENTS, TO FISHER BODY CORPORATION, A CORPORATION OF NEW YORK.

AUTOMOBILE-BODY.

1,235,731.     Specification of Letters Patent.     Patented Aug. 7, 1917.

Application filed April 29, 1916. Serial No. 94,291.

*To all whom it may concern:*

Be it known that I, GEORGE S. SMITH, a citizen of the United States, residing at Detroit, county of Wayne, State of Michigan, have invented a certain new and useful Improvement in Automobile-Bodies, and declare the following to be a full, clear, and exact description of the same, such as will enable others skilled in the art to which it pertains to make and use the same, reference being had to the accompanying drawings, which form a part of this specification.

This invention relates to automobile bodies and has for its object a special form of collapsible coupélet or cabriolet body. Collapsible coupélets or cabriolets are old in the art, but most bodies of this type are objectionable for the reason that their construction is such that the driver cannot see out at the sides of the seat but is compelled to lean forward and look through the windows in the door or else a small celluloid window is provided in the flexible top material. This makes driving in a closed coupélet or cabriolet rather uncomfortable and dangerous for want of a proper side view.

It is to obviate this danger and afford an additional window in bodies of this type that the present invention is designed.

In the drawings,—

Figure 1 is a side elevation of the closed body.

Fig. 2 is a side elevation of the body with the top collapsed showing by the broken side how the door and window posts are stowed away.

Fig. 3 is a detail of the strap which connects with the mid bow.

$a$ designates the body; $b$ the two-part door and window posts or the side posts; $c$ the windshield; $d$ the front and rear windows which can be dropped in the window pockets as shown in Fig. 2, and $e$ designates the collapsible top. The collapsible top is made of a rear quarter section comprising the master bow hinged to the body by the strap hinge $g$, a horizontal rear top bow $h$ permanently attached to the master bow $f$ near the top and projecting horizontally backward, and a supplemental rear bow $i$ permanently attached to the rear top bow $h$ near the rear thereof and extending upwardly and obliquely backward. The jointed prop $j$ pivoted to the extreme rear and top of the body $a$ contains a joint $k$ at about the lower quarter point and is pivoted at the top to the angle bracket $l$ which secures the rear top bow $h$ to the master bow. These devices constitute the rear quarter section which collapses in the manner shown in Fig. 2.

The front three-quarters of the top is adapted to project over and cover the part of the coupélet body which is inclosed by the side windows and windshield. This front three-quarters comprises a top rail $m$ to which is attached the triple hinge $n$ made up of one long strap $o$ that extends substantially from the middle of the top rail to the rear, one short strap $p$ which is pivoted to the long strap and secured to the rail $m$, one short strap $q$ pivoted to the strap $o$ and secured to the mid bow $r$ in the manner detailed in Fig. 3, and one short strap $s$ pivoted to the long strap $o$ at the rear and permanently secured to the front of the master bow in much the same manner as shown in Fig. 3. This hinging arrangement permits the three-quarter front section to fold at substantially the rear third point of the three-quarter section and the half point of the complete top. In collapsing the parts assume the position shown in Fig. 2, in which the rail $m$ is on top, the mid bow $r$ folds under the rail $m$ and the long strap of the triple hinge folds against the master bow. This makes it a convenient and expeditious way of collapsing the top.

The forward side structure is disposed of with convenience and rapidity by simply dropping the windows into the window pockets as shown in Fig. 2 and removing the door and window posts $p$. These can be carried under the seat as shown in Fig. 2, so that in case inclement weather requires the sides of the vehicle to be protected, the same may be easily put in place and the windows $d$ pulled up.

It has not been thought necessary to detail the locking devices by which the window posts are locked to the top and body as these may be varied and a suitable set of these locking devices can be found in prior art.

What I claim is:

1. In an automobile body, the combination of a lower body portion, a master bow hinged thereto, and a three-quarter forward top section, comprising a top rail and mid bow structure, and a strap for hinging the top rail near its mid point to the master bow and for also hinging the mid bow to the master bow.

2. In an automobile body, the combination of a lower body portion, a master bow hinged thereto at the top and rear, a jointed prop pivoted to the lower body portion at the top and rear and pivoted to the top of the master bow, a rear supplemental bow structure attached to the master bow, a forward three-quarter section comprising a triple hinge having a short strap attached to the top of the master bow, a long strap pivoted to the short strap and at its forward end carrying two short straps pivoted thereto, a mid bow secured to one of the short straps, a top rail secured to the other short strap, and a removable side structure for each side of the body.

3. In an automobile body, the combination of a lower body portion, a master bow hinged thereto at the top and rear, a forward three-quarter section comprising a triple hinge having a short strap attached to the top of the master bow, a long strap pivoted to the short strap and at its forward end carrying two short straps pivoted thereto, a mid bow secured to one of the short straps, and a top rail secured to the other short strap.

In testimony whereof, I sign this specification.

GEORGE S. SMITH.

Copies of this patent may be obtained for five cents each, by addressing the "Commissioner of Patents, Washington, D. C."